US010055968B2

(12) United States Patent
Marra et al.

(10) Patent No.: US 10,055,968 B2
(45) Date of Patent: *Aug. 21, 2018

(54) PAYMENT CARD LOCATION METHOD AND APPARATUS

(71) Applicant: MASTERCARD INTERNATIONAL INCORPORATED, Purchase, NY (US)

(72) Inventors: Antonio Marra, Fishkill, NY (US); Prashant Sharma, Ballwin, MO (US); Mark Richard Anderson, Stamford, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/467,875

(22) Filed: Mar. 23, 2017

(65) Prior Publication Data

US 2017/0193800 A1 Jul. 6, 2017

Related U.S. Application Data

(63) Continuation of application No. 14/159,834, filed on Jan. 21, 2014, now Pat. No. 9,640,060.

(51) Int. Cl.
*G08B 21/24* (2006.01)
*H04W 4/02* (2018.01)
*G06Q 20/34* (2012.01)
*H04W 8/00* (2009.01)
*H04W 4/00* (2018.01)
*G06F 17/30* (2006.01)
*H04W 4/80* (2018.01)

(52) U.S. Cl.
CPC ....... *G08B 21/24* (2013.01); *G06F 17/30864* (2013.01); *G06Q 20/341* (2013.01); *H04W 4/008* (2013.01); *H04W 4/023* (2013.01); *H04W 4/80* (2018.02); *H04W 8/005* (2013.01)

(58) Field of Classification Search
CPC ........ G06Q 20/32; G06Q 40/02; G06Q 20/02; G06Q 20/20; G06Q 20/325; G06Q 20/327; G06Q 20/3278; G06Q 20/341; G06Q 20/352; G06Q 20/382; H04B 5/0062; H04B 5/02; H04B 5/0031; H04B 5/0068; G06F 19/32; G06K 7/0008; G06K 7/082; G07F 19/206; G07F 7/0886; G07F 7/1008; G07F 7/1016; G08B 21/24; H04L 2209/56; H04M 1/7253; H04M 1/72572; H04M 2250/02; H04M 2250/10; H04W 12/02; H04W 4/008
See application file for complete search history.

(56) References Cited

U.S. PATENT DOCUMENTS

| 4,860,336 | A | * | 8/1989 | D'Avello | G06Q 20/32 379/114.19 |
| 5,239,664 | A | * | 8/1993 | Verrier | G06K 19/073 713/194 |
| 6,163,771 | A | * | 12/2000 | Walker | G06Q 20/04 705/18 |
| 6,832,721 | B2 | * | 12/2004 | Fujii | G06F 21/34 235/379 |

(Continued)

Primary Examiner — Fekadeselassie Girma
(74) Attorney, Agent, or Firm — Ballard Spahr LLP

(57) ABSTRACT

A system, method, and computer-readable storage medium configured to track the location of lost payment cards.

20 Claims, 9 Drawing Sheets

(56) References Cited

U.S. PATENT DOCUMENTS

| | | | | |
|---|---|---|---|---|
| 2004/0230489 | A1* | 11/2004 | Goldthwaite | G06K 7/0004 705/26.1 |
| 2006/0049256 | A1* | 3/2006 | von Mueller | G06F 21/72 235/449 |
| 2006/0052055 | A1* | 3/2006 | Rowse | G06K 7/0008 455/41.1 |
| 2006/0065719 | A1* | 3/2006 | Doyle | G06Q 20/20 235/382 |
| 2006/0122931 | A1* | 6/2006 | Walker | G06Q 20/04 705/39 |
| 2007/0142033 | A1* | 6/2007 | Deas | H04N 7/17318 455/411 |
| 2007/0250441 | A1* | 10/2007 | Paulsen | G06Q 20/02 705/39 |
| 2008/0314325 | A1* | 12/2008 | Hempstead | A01K 11/004 119/51.02 |
| 2009/0102639 | A1* | 4/2009 | Bozionek | H04W 64/00 340/539.1 |
| 2009/0164382 | A1* | 6/2009 | Sally | G06Q 20/24 705/67 |
| 2009/0325593 | A1* | 12/2009 | Do | G08B 21/24 455/456.1 |
| 2012/0190455 | A1* | 7/2012 | Briggs | H04L 67/38 463/42 |
| 2012/0310760 | A1* | 12/2012 | Phillips | G06Q 40/02 705/26.1 |
| 2013/0041831 | A1* | 2/2013 | Das | G06Q 20/20 705/72 |
| 2013/0226704 | A1* | 8/2013 | Fernandez | G06Q 30/0261 705/14.58 |
| 2013/0232082 | A1* | 9/2013 | Krawczewicz | G06F 19/324 705/55 |
| 2013/0247117 | A1* | 9/2013 | Yamada | G08C 17/02 725/93 |
| 2014/0289804 | A1* | 9/2014 | Drazan | G06Q 10/109 726/4 |
| 2015/0296348 | A1* | 10/2015 | Ghabra | H04W 4/046 455/456.1 |

* cited by examiner

PAYMENT CARD LOCATION METHOD AND APPARATUS

RELATED APPLICATIONS

This application claims priority to non-provisional U.S. patent application Ser. No. 14/159,834, filed Jan. 21, 2014, which is herein incorporated by reference in its entirety.

BACKGROUND

Field of the Disclosure

Aspects of the disclosure relate in general to financial services. Aspects include an apparatus, system, method and computer-readable storage medium to track the location of lost payment cards.

Description of the Related Art

The use of payment cards, such as credit or debit cards, is ubiquitous in commerce. Typically, a payment card is electronically linked via a payment network to an account or accounts belonging to a cardholder. These accounts are generally deposit accounts, loan or credit accounts at an issuer financial institution. During a purchase transaction, the cardholder can present the payment card in lieu of cash or other forms of payment.

When payment cards are lost or misplaced, cardholders can retrace their steps to find the card, or contact the card issuer to report the card missing.

SUMMARY

Embodiments include a system, apparatus, device, method and computer-readable medium configured to track the location of lost payment cards.

In a mobile device method embodiment, a mobile device antenna wirelessly polls for the presence of a payment card. An identifier associated with the payment card is received with the antenna. A processor matches the identifier associated with the payment card with an identifier associated with a lost payment card, and determines a present location of the mobile device. The mobile device wirelessly transmits a message to a server, the message indicating that the lost payment card was detected and the present location of the mobile device.

DETAILED DESCRIPTION

One aspect of the disclosure includes the understanding that cardholders tend to travel with mobile devices in close proximity with their payment cards. Such mobile devices include mobile telephones, tablet computers, laptop or notebook computers, personal digital assistants (PDAs), or any other mobile device known in the art. Typically, the mobile device and the payment card are kept on the person (e.g., in a pocket), or nearby in a purse, briefcase, backpack or other portable storage container. For the purposes of this disclosure, a payment card includes, but is not limited to: credit cards, debit cards, prepaid cards, electronic checking, stored-value cards, or other physical payment devices. Payment card embodiments in this disclosure are wireless-enabled.

Yet another aspect of the disclosure is the realization that many cardholders rarely travel without a mobile device and their payment cards.

Another aspect of the disclosure includes the realization that rapidly increasing use of mobile devices offers the ability to wirelessly track the position of wireless-enabled payment cards, which enables cardholders to find their lost payment cards.

Embodiments of the present disclosure include a system, apparatus, method, and computer-readable storage medium configured to track the location of lost payment cards.

Figure 1:
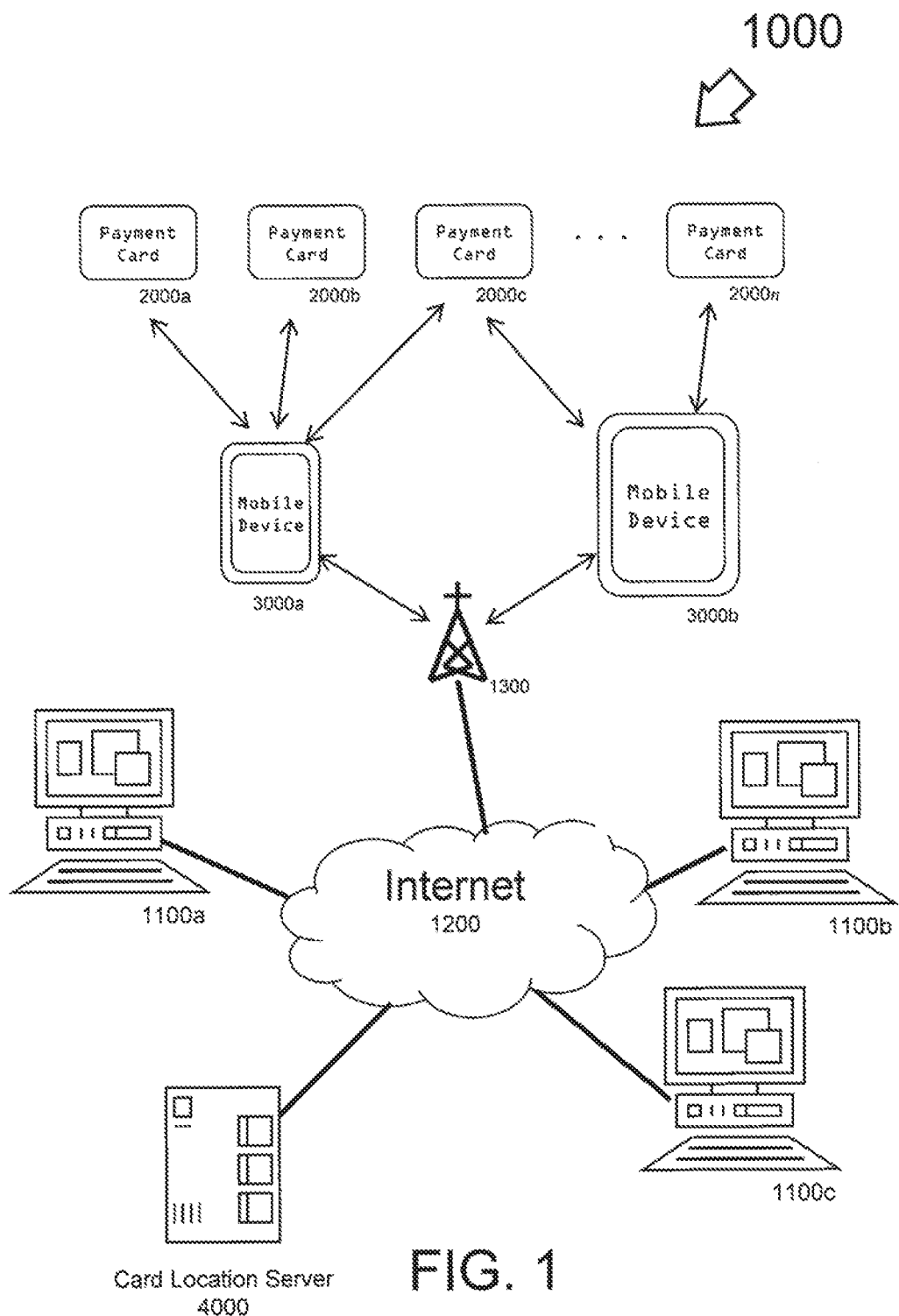
FIG. 1 illustrates an embodiment of a system configured to track the location of lost payment cards.

Embodiments will now be disclosed with reference to a block diagram of an exemplary system 1000 of FIG. 1 configured to track the location of lost payment cards, constructed and operative in accordance with an embodiment of the present disclosure.

System 1000 includes cardholders using payment cards 2000*a-n* and mobile devices 3000 to track and connect to a card location server 4000 via a data network, such as a mobile telephone network or data network 1300. An example data network includes the Internet 1200 and the like.

In such a system, wireless-enabled payment cards 2000*a-n* are tracked by mobile devices 3000*a-b*. Mobile devices 3000 may include a mobile phone, tablet computer, personal digital assistant (PDA) or other portable computing device known in the art capable of wirelessly tracking payment cards 2000, and reporting the payment card location to a card location server 4000.

Mobile devices 3000 report the location of payment cards 2000 to a card location server 4000. The card location server 4000 may exist at a payment network, issuer financial institution, or other entity. An example payment network includes MasterCard International Incorporated of Purchase, N.Y. An issuer is the financial institution that issues the payment card.

When a payment card 2000 is reported lost by a cardholder, participating mobile devices 3000 that are proximately located to the last known location of the payment card 2000 are enlisted to anonymously detect, and report the location of the payment card 2000.

When the lost payment card's location has been determined, the cardholder is alerted or otherwise notified of the lost payment card location. In some embodiments, cardholders may use a personal computer 1100*a-c* to view the last known location of their own payment cards by connecting to the card location server 4000 via the Internet 1200 or World-Wide-Web.

Example embodiments and method uses of payment card 2000 mobile device 3000, and card location server 4000 are discussed below.

Figure 2A:
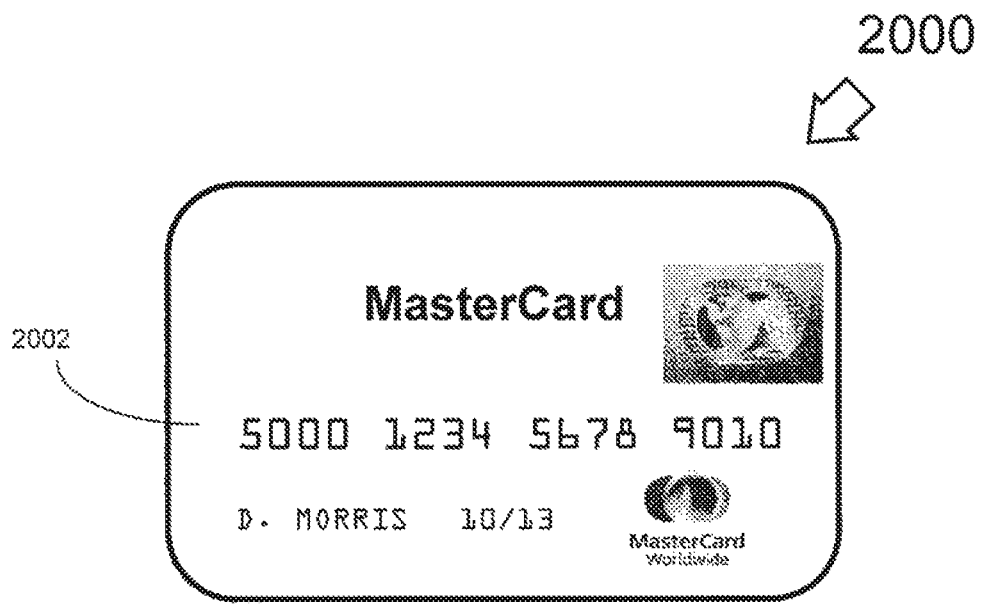
FIGS. 2A depicts a payment card in a system configured to track the location of lost payment cards.
Figure 2B:
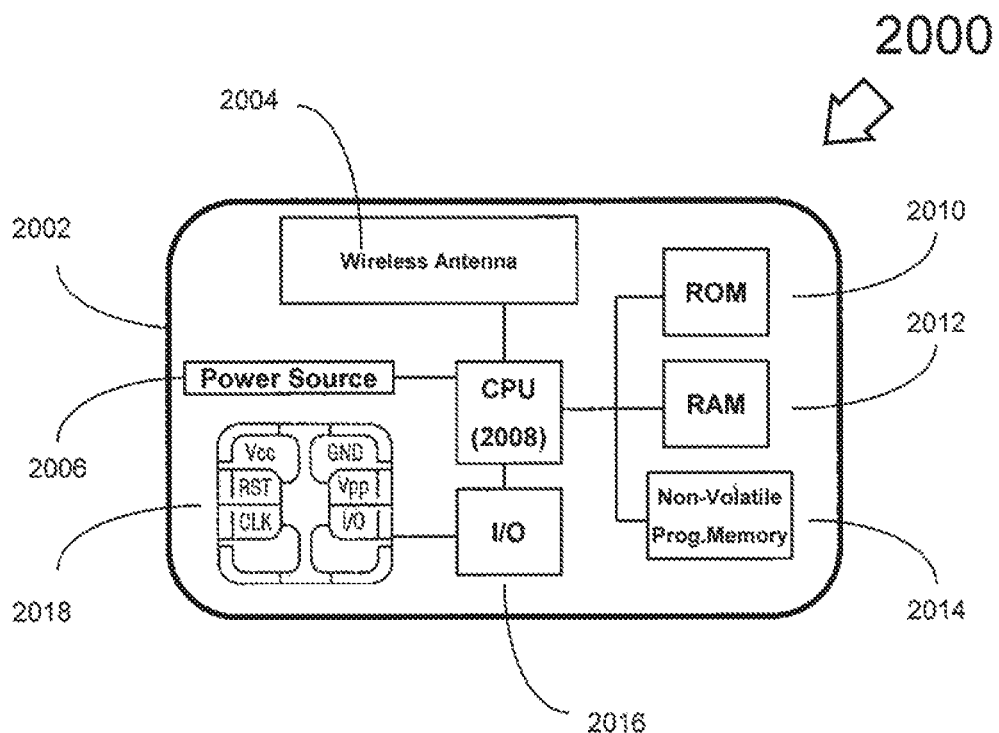
FIGS. 2B depicts a payment card in a system configured to track the location of lost payment cards.

Turning to FIGS. 2A-B, these figures depict a payment card 2000 designed to be used in a system to wirelessly track the location of lost payment cards, constructed and operative in accordance with an embodiment of the present disclosure.

As shown in FIG. 2A, the payment card 2000 includes a plastic support 2002. It is understood that plastic support 2002 may further contain a stamped imprint of a primary account number, a customer name, expiration date, and various security measures, such as a hologram or signature panel. Some embodiments of plastic support 2002 also have a magnetic stripe containing certain information, such as the personal account number and the expiration date. Plastic support 2002 may be compliant with the International Organization for Standardization (ISO)/International Electrotechnical Commission (IEC) 7810 ID-1 physical card standard.

Internal components of payment card 2000 are shown in FIG. 2B. Embedded within plastic support 2002, a processor or central processing unit 2008 is electrically coupled to the wireless antenna 2004, power source 2006, Read-Only-Memory (ROM) 2010, Random Access Memory (RAM) 2012, a non-volatile programmable memory 2014, and input/output circuitry 2016. It is understood by those familiar with the art that some or all of these elements may be embedded together in some combination as an integrated circuit (IC). Embodiments may also contain a conductive contact-making element 2018.

Wireless antenna 2004 is a radio frequency (RF) transceiver. Wireless antenna 2004 may use any RF transceiver known in the art for use in a radio frequency identifier (RFID) application or commonly used in a "contactless" payment card. In some embodiments, payment card 2000 may communicate via near field communication (NFC) using the ISO/IEC 14443 standard, including PayPass™ or MasterPass™ enabled payment cards. PayPass™ and MasterPass™ are trademarks of MasterCard International Incorporated of Purchase, N.Y. In alternate embodiments, wireless antenna 2004 may communicate using the IEEE 802.11 standards ("WiFi") or the IEEE 802.15.1 standard, commonly known as "Bluetooth," or Bluetooth Low Energy.

Wireless antenna 2004 allows payment card 2000 to communicate wirelessly with a mobile device 3000. Bluetooth wireless antenna 2004 embodiments may have a range of approximately 100 meters, while Bluetooth Low Energy embodiments may have a range of approximately 50 meters.

Processor 2008 may be any central processing unit, microprocessor, micro-controller, computational device or circuit known in the art.

Read only memory 2010 may be embedded with an operating system.

Non-volatile programmable memory 2014 is configured to be an application memory device, and may store information such as the primary account number and/or other card identifier. Examples of non-volatile programmable memory 2014 include, but not limited to: a magnetic stripe, flash memory, Electrically Erasable Programmable Read-Only Memory (EEPROM), or any other non-volatile computer memory or storage known in the art.

Random access memory 2012 is any temporary memory storage medium element known in the art. Random access memory is usually (but does not have to be) volatile memory.

The processor 2008, the read only memory 2010, the random access memory 2012 and the non-volatile programmable memory 2014 may couple to one another through an internal bus system. Data can be interchanged between the input/output unit 2016, the processor 2008 and the non-volatile programmable memory 2014. Furthermore, data can be interchanged between the processor 2008 and the non-volatile programmable memory 2014.

Additionally, in some embodiments, the input/output circuitry 2016 is further coupled to a conductive contact-making element 2018 being formed in a surface area of the plastic support 2002.

The electrically conductive contact-making element 2018 contains area elements that are electrically decoupled from one another, and these are annotated VCC, GND, RST, VPP, CLK and I/O. VCC is the connection for a supply voltage, RST is the connection for a reset signal, CLK is the connection for a clock signal, GND is the ground connection, VPP is the connection for a programming voltage, and I/O forms a connection as a data input/data output. The connection RST is used for application of a start signal for communication. A clock for the smart card processor is supplied from the outside via the connection CLK, with the clock frequency according to the described exemplary embodiment being 7.5 MHz. The programming voltage that is applied to the connection VPP is usually a voltage higher than the supply voltage. Bi-directional data transmission takes place via the input/output connection I/O for the actual interchange of useful information with the smart card. Similar data exchange or transmission takes place in contactless embodiments.

Power source 2006 may be any electrical power supply, including a battery, fuel cell, long-term capacitor or any other power storage known in the art. Power supply 2006 may be recharged by applying a direct current voltage. A voltage is applied to the payment card 2000 as the supply voltage VCC. Example supply voltages include 5 volts, 3.3 volts, or 1.7 volts. In alternate embodiments, power source 2006 is an inductor. When passed through a magnetic field, the inductor generates power.

Figure 3:
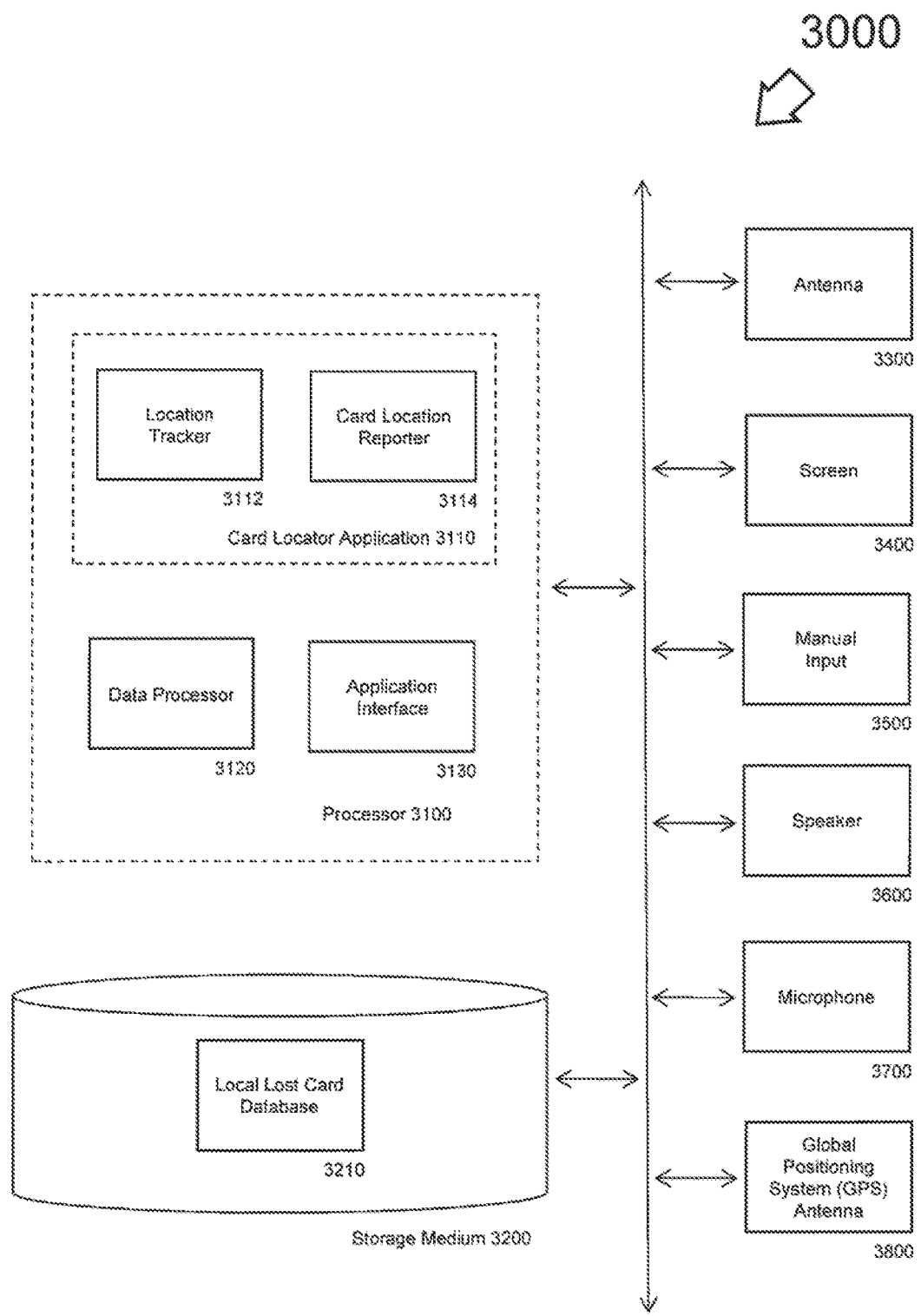
FIG. 3 is a block diagram of a mobile device in a system configured to track the location of lost payment cards.

Embodiments will now be disclosed with reference to a block diagram of a mobile device 3000 of FIG. 3 designed to be used in a system 1000 to wirelessly track the location of lost payment cards, constructed and operative in accordance with an embodiment of the present disclosure. When used in conjunction with a card location server 4000 and payment card 2000, mobile device 3000 may be used to wirelessly track the location of lost payment cards. In this example, mobile device 3000 is a mobile phone. As mentioned above, it is understood by those familiar with the art that mobile device 3000 may be a mobile phone, tablet computer, personal digital assistant (PDA) or other portable computing device known in the art capable of wirelessly tracking payment cards 2000, and reporting the payment card location to a card location server 4000.

Mobile device 3000 may run a real-time multi-tasking operating system (OS) and include at least one processor or central processing unit (CPU) 3100, a non-transitory computer-readable storage medium 3200, an antenna 3300 and Global Positioning System (GPS) antenna 3800. An example operating system may include the Apple iOS, Google Android Operating System, Blackberry OS, FireFox mobile operating system, Microsoft Windows 8, and the like. Mobile device 3000 may further include a screen or display device 3400, manual input 3500, speaker 3600, and microphone 3700.

Processor 3100 may be any central processing unit, microprocessor, micro-controller, computational device or circuit known in the art. It is understood that processor 3100 may temporarily store instructions and data in Random Access Memory (not shown)

As shown in FIG. 3, processor 3100 is functionally comprised of a card locator application 3110, a data processor 3120, and application interface 3130.

Card locator application 3110 enables the functionality for the consumer to locate a lost payment card. Card locator application 3110 may further comprise: location tracker 3112, and card location reporter 3114.

A location tracker 3112 is a program or service that wirelessly tracks the presence of payment card 2000. A location tracker 3112 uses antenna 3300 to detect payment card 2000 wirelessly, and may do so via NFC, RFID, Bluetooth, WiFi or other wireless standard known in the art. Location tracker 3112 may attempt to match detected payment cards 2000 with a local lost card database 3210 may be stored in on a computer-readable storage media 3200.

Card location reporter 3114 enables the reporting of detected known payment cards and detected lost payment cards to card location server 4000. Further details and uses of card location reporter 3114 are described further herein.

Data processor 3120 enables processor 3100 to interface with storage media 3200, antenna 3300, screen 3400, manual input 3500, speaker 3600, microphone 3700, GPS antenna 3800, computer memory or any other component not on the processor 3100. The data processor 3120 enables processor 3100 to locate data on, read data from, and write data to these components.

Application interface 3130 may be any graphical user interface known in the art to facilitate communication with the user of the mobile device 3000; as such, application interface 3130 may communicate with the user via screen 3400, manual input 3500, speaker 3600, or microphone 3700.

These structures may be implemented as hardware, firmware, or software encoded on a computer readable medium, such as storage media 3200. Further details of these components are described with their relation to method embodiments below.

Antenna 3300 may be any data port as is known in the art for interfacing, communicating or transferring data across a telecommunications network, computer network, Bluetooth, WiFi, near-field communications, contactless point-of-sale network, and the like. Examples of such a network include a digital cellular telephony network. Antenna 3300 allows mobile device 3000 to communicate via the digital cellular telephony network to Card Location Server 4000, or other entities. Furthermore, antenna 3300 allows mobile device 3000 to detect and communicate with payment card 2000.

Screen 3400 may be any liquid crystal display (LCD) display, light emitting diode (LED) screen, touch-sensitive screen, or other monitor known in the art for visually displaying images and text to a user.

Manual input 3500 may be buttons, a conventional keyboard, keypad, track pad, trackball, or other input device as is known in the art for the manual input of data. In some embodiments, manual input 3500 may be integrated into a touch-sensitive screen 3400. In other embodiments, manual input 3500 may be a virtual keyboard.

In addition, a speaker 3600 may be attached for reproducing audio signals from processor 3100. Microphone 3700 may be any suitable microphone as is known in the art for providing audio signals to processor 3100.

GPS antenna 3800 is satellite-based navigation antenna that allows mobile device 3000 to ascertain its location by triangulating with satellites as one skilled in the art can appreciate. In some embodiments, GPS antenna 3800 additionally uses triangulation with cellular or mobile phone antennas to determine device location.

It is understood that microphone 3700, speaker 3600, and GPS antenna 3800 may include appropriate digital-to-analog and analog-to-digital conversion circuitry as appropriate.

Storage medium 3200 may be a conventional read/write memory, such as a flash memory, memory stick, transistor-based memory, or other computer-readable memory device as is known in the art for storing and retrieving data.

In addition, as shown in FIG. 3, storage medium 3200 may also contain a local lost card database 3210. When present, local lost card database 3210 is a data structure or database that contains a list of lost payment cards proximately located near mobile device 3000. Such a lost card database 3210 includes at least one unique identifier associated with a lost payment card 2000. The unique identifier may be a hash of the payment card primary account number or other identifier able to uniquely identify the lost payment card 2000.

Figure 4:
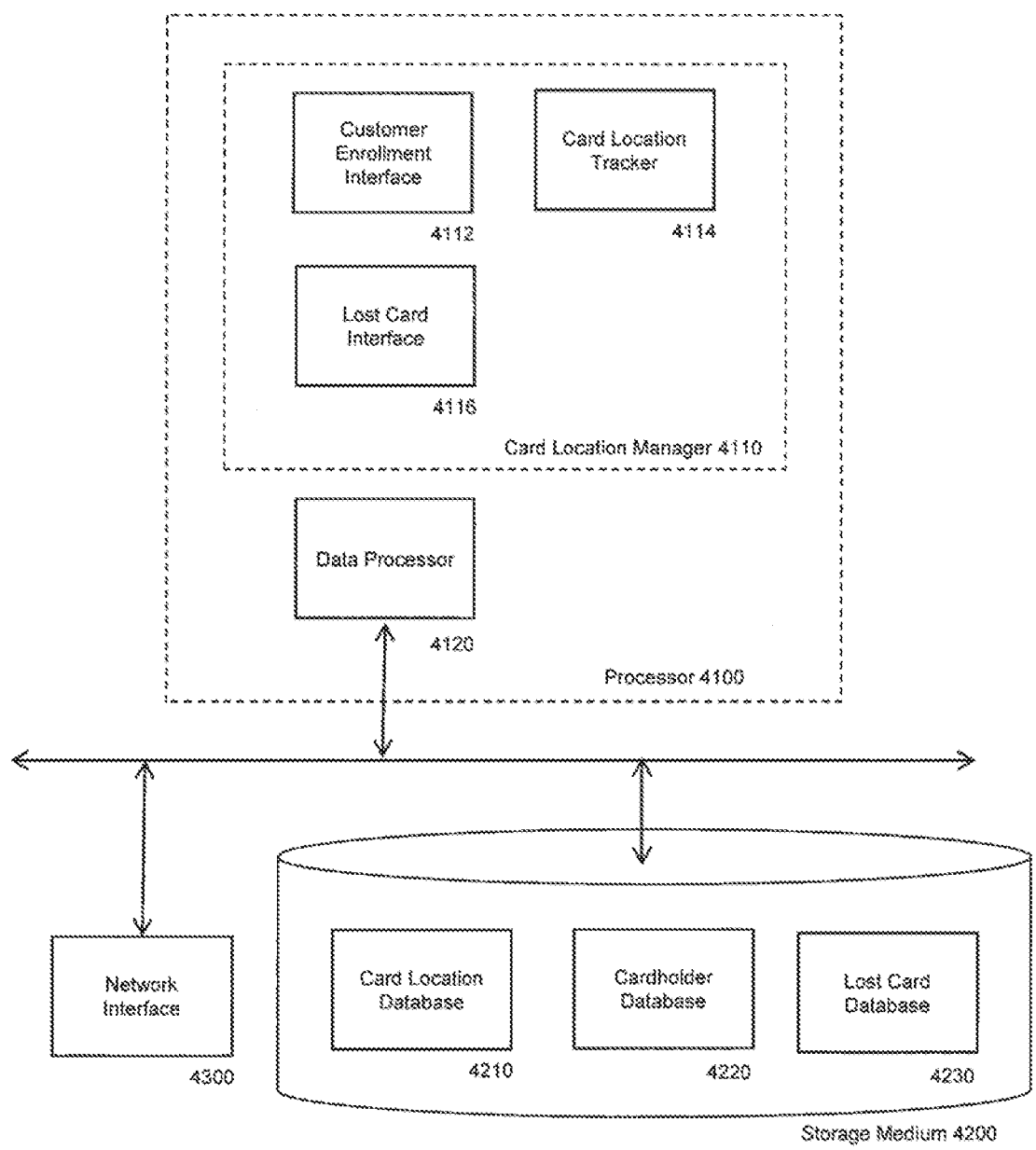
FIG. 4 depicts a block diagram of a card tracking server in a system configured to track the location of lost payment cards.

Embodiments will now be disclosed with reference to a block diagram of an exemplary card location server 4000 of FIG. 4 configured to track the location of lost payment cards, constructed and operative in accordance with an embodiment of the present disclosure.

Card location server 4000 may run a multi-tasking operating system (OS) and include at least one processor or central processing unit (CPU) 4100, a non-transitory computer-readable storage medium 4200, and a network interface 4300. An example operating system may include Advanced Interactive Executive (AIX™) operating system, UNIX operating system, or LINUX operating system, and the like.

Processor 4100 may be any central processing unit, microprocessor, micro-controller, computational device or circuit known in the art. It is understood that processor 4100 may communicate with and temporarily store information in Random Access Memory (RAM) (not shown).

As shown in FIG. 4, processor 4100 is functionally comprised of a card location manager 4110, and a data processor 4120.

Card location manager 4110 is a component configured to perform risk estimation by analyzing financial transactions. Card location manager 4110 may further comprise: a customer enrollment interface 4112, card location tracker 4114, and lost card interface 4116.

Customer enrollment interface 4112 is an application interface that allows cardholders to opt into payment card 2000 tracking. Once cardholders opt-in via the customer enrollment interface 4112, a record corresponding to the payment card in a cardholder database 4220 is updated, showing the enrollment.

Card location tracker 4114 is the structure or component capable of processing payment card location data received (via a network interface 4300) from a mobile device 3000. Card location tracker 4114 may store the location data in a card location database 4210.

Lost card interface 4116 is any structure configured to receive a message from mobile device 3000 (via the network interface 4300) indicating that a payment card 2000 is lost or missing.

Data processor 4120 enables processor 4100 to interface with storage media 4200, network interface 4300 or any other component not on the processor 4100. The data processor 4120 enables processor 4100 to locate data on, read data from, and write data to these components.

These structures may be implemented as hardware, firmware, or software encoded on a computer readable medium, such as storage media 4200. Further details of these components are described with their relation to method embodiments below.

Network interface 4300 may be any data port as is known in the art for interfacing, communicating or transferring data across a computer network, examples of such networks include Transmission Control Protocol/Internet Protocol (TCP/IP), Ethernet, Fiber Distributed Data Interface (FDDI), token bus, or token ring networks. Network interface 4300 allows card location server 4000 to communicate with cardholders using mobile devices 3000 or other computing devices 1100a-c.

Computer-readable storage media 4200 may be a conventional read/write memory such as a magnetic disk drive, floppy disk drive, optical drive, compact-disk read-only-memory (CD-ROM) drive, digital versatile disk (DVD) drive, high definition digital versatile disk (HD-DVD) drive, Blu-ray disc drive, magneto-optical drive, optical drive, flash memory, memory stick, transistor-based memory, magnetic tape or other computer-readable memory device as is known in the art for storing and retrieving data. Significantly, computer-readable storage media 4200 may be remotely located from processor 4100, and be connected to processor 4100 via a network such as a local area network (LAN), a wide area network (WAN), or the Internet.

In addition, as shown in FIG. 4, storage medium 4200 may also contain a card location database 4210, a cardholder database 4220, and a lost card database 4230. Card location database 4210 is configured to store records of reported payment card locations. Cardholder database 4220 is configured to store cardholder information and transactions information related to specific cardholders. A lost card database 4230 is a database storing records of all known lost payment cards.

It is understood by those familiar with the art that one or more of these databases 4210-4230 may be combined in a myriad of combinations. The function of these structures may best be understood with respect to the flowcharts of FIGS. 5-9, as described below.

We now turn our attention to the method or process embodiments of the present disclosure described in the flow diagrams of FIGS. 5-9. It is understood by those known in the art that instructions for such method embodiments may be stored on their respective computer-readable memory and executed by their respective processors. It is understood by those skilled in the art that other equivalent implementations can exist without departing from the spirit or claims of the disclosure.

Figure 5:
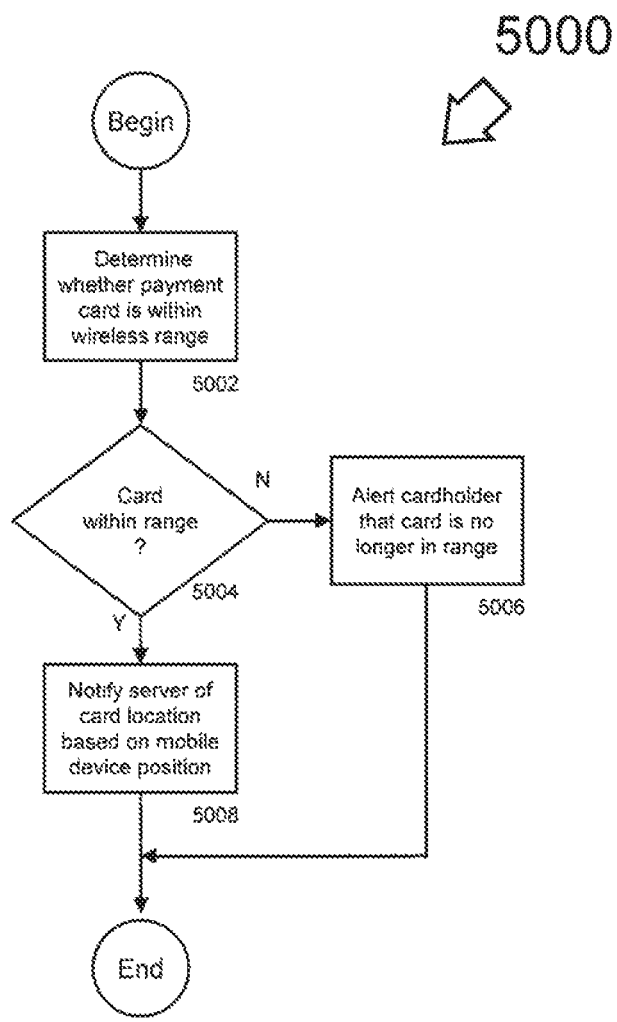
FIG. 5 illustrates a flow chart of a method to report payment card location by a mobile device.

FIG. 5 illustrates a flow chart of method 5000 of payment card location reporting by a mobile device 3000, constructed and operative in accordance with an embodiment of the present disclosure. When a cardholder opts into payment card 2000 tracking, card locator application 3110 tracks the presence of payment card 2000 wirelessly.

At block 5002, mobile device 3000 determines whether there are associated payment cards 2000 within wireless range. Location tracker 3112 uses antenna 3300 to poll for payment cards 2000 within its vicinity. In at least one embodiment, antenna 3300 acts as a master, using the Bluetooth standard, to transmit in the 2.4 GHz short-range radio frequency band. Bluetooth is a packet-based protocol with a master-slave structure. A payment card 2000 receives the poll, and responds as a slave, transmitting a unique identifier, which is associated with the payment card. In some embodiments, the unique identifier is a hash of the payment card's primary account number (PAN).

When the payment card 2000 fails to respond to the wireless poll, as determined at decision block 5004, an alert is sent to the cardholder indicating that the payment card is no longer in wireless range, block 5006. The alert may be displayed on the screen 3400 of the mobile device 3000, sent as an e-mail alert, a short message service (SMS) message, text-alert, telephone call, or any other alert known in the art. The alert message allows cardholders to realize that the payment card 2000 is no longer in their possession and that they can take appropriate actions to locate the payment card 2000.

When the payment card 2000 responds to the wireless poll, as determined at decision block 5004, mobile device 3000 notifies the card location server 4000 of the payment card's location via the network interface 4300, block 5008. The location of the payment card 2000 is deemed to be the location of the mobile device 3000, as determined by the GPS antenna 3800. The notification may occur via a message containing the unique identifier transmitted by the payment card 2000 along with the current coordinates of the mobile device 3000.

Note that in some embodiments, the locations of the payment card 2000 are not periodically sent to card location server 4000, but are instead stored on mobile device 3000. In such an embodiment, the last known payment card location is sent when payment card 2000 is reported lost or missing.

Figure 6:
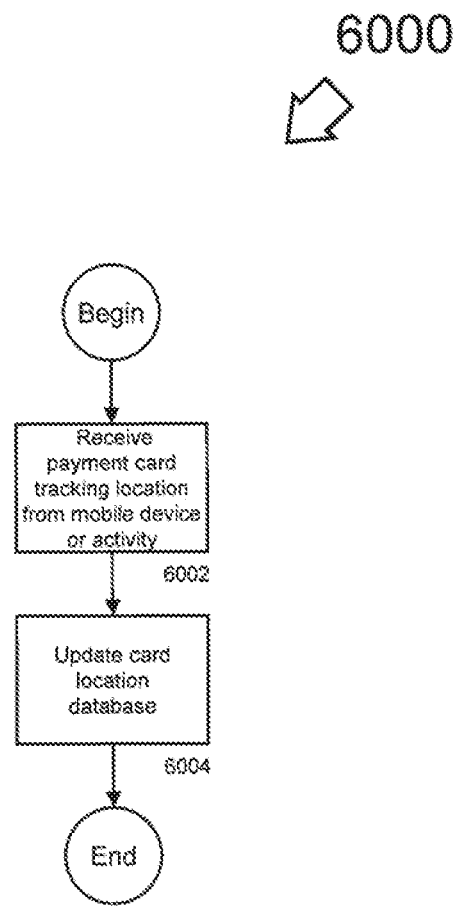
FIG. 6 depicts a method of tracking payment card location reporting by a card tracking server.

Moving to FIG. 6, process 6000 is a method of tracking payment card location reporting by a card tracking server 4000, constructed and operative in accordance with an embodiment of the present disclosure. At block 6002, card location tracker 4114 receives a message from mobile device 3000. The message contains a unique identifier associated with payment card 2000, and geographic coordinates. Card location database 4210 is updated with the provided information, block 6004.

In an alternate embodiment, the locations of the payment card 2000 are not periodically sent to card location server 4000, but are instead stored on mobile device 3000. In such an embodiment, the last known payment card location is received from the mobile device 3000 by card location server 4000 when payment card 2000 is reported lost or missing.

Figure 7:
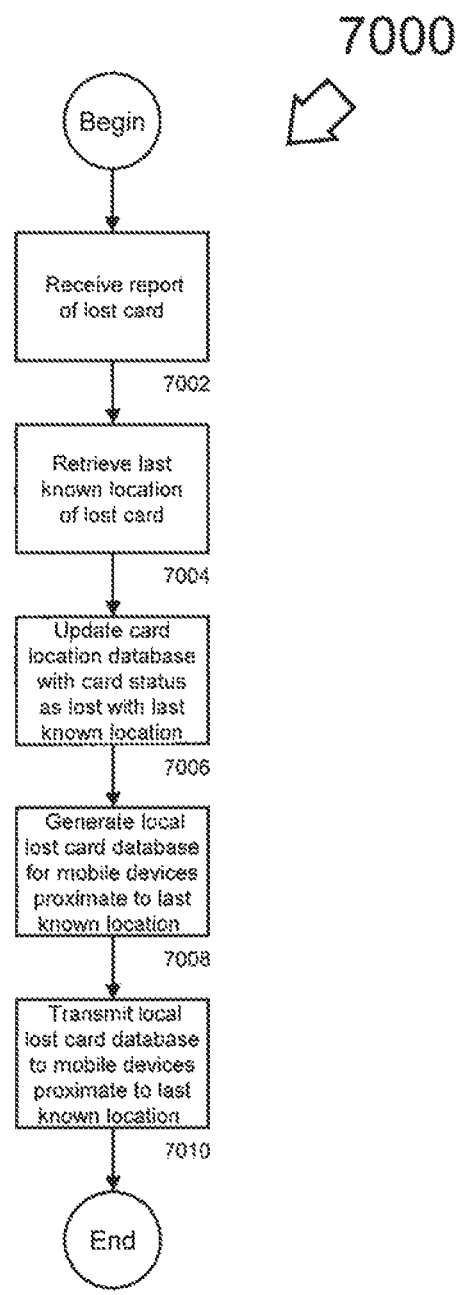
FIG. 7 is a flow chart of processing lost payment card location reporting by a card tracking server.

FIG. 7 is a flow chart of method 7000 of processing lost payment card location reporting by a card tracking server 4000, constructed and operative in accordance with an embodiment of the present disclosure.

At block 7002, the card location server 4000 receives a report of a lost payment card, via a lost card interface 4116. The lost card information may be received by any method known in the art, including, but riot limited to: a telephone call from the cardholder, electronic mail, text message, disclosure to an application on a mobile device 3000, electronic entry by a customer service representative, or any other method known in the art. Usually, when a card is lost, the cardholder may provide the primary account number of the lost card, their name, government identification number, or other identifier.

At block 7004, card location tracker 4114 retrieves the last known location of the lost payment card 2000 from the card location database 4210.

In embodiments where the locations of the payment card 2000 are not periodically sent to card location server 4000, but are instead stored on mobile device 3000, card location tracker 4114 queries mobile device 3000 for the known location of the payment card 2000.

The card location database is updated, block 7006 so that the status of the lost payment card is designated in some manner as "lost" with a last known location.

Using the last known location and lost card database 4230, card location tracker 4114 generates a local lost card database 3210 for mobile devices that are proximate to the last known location, block 7008. For example, suppose the last known location of a missing payment card is in Times Square, in New York City. Mobile devices within a quarter or half-mile radius may be deemed as proximate. A lost card database 3210 may be a list or other data structure of all lost cards where the last known location is a half-mile radius from Times Square. In some embodiments, the lost card database 3210 may be a partial list of lost cards.

The determination for mobile devices that are proximate to the last known location may vary depending upon the population density of the last known location. Typically, when an area has a high population density, the radius chosen may be smaller than an area with low population density. For example, if the last known payment card is in a rural or sub-urban area, the radius of "proximity" may be larger.

The card location tracker 4114 transmits the local card database 3210 to the mobile devices 2000 that are proximate to the last known at block 7010.

Figure 8:
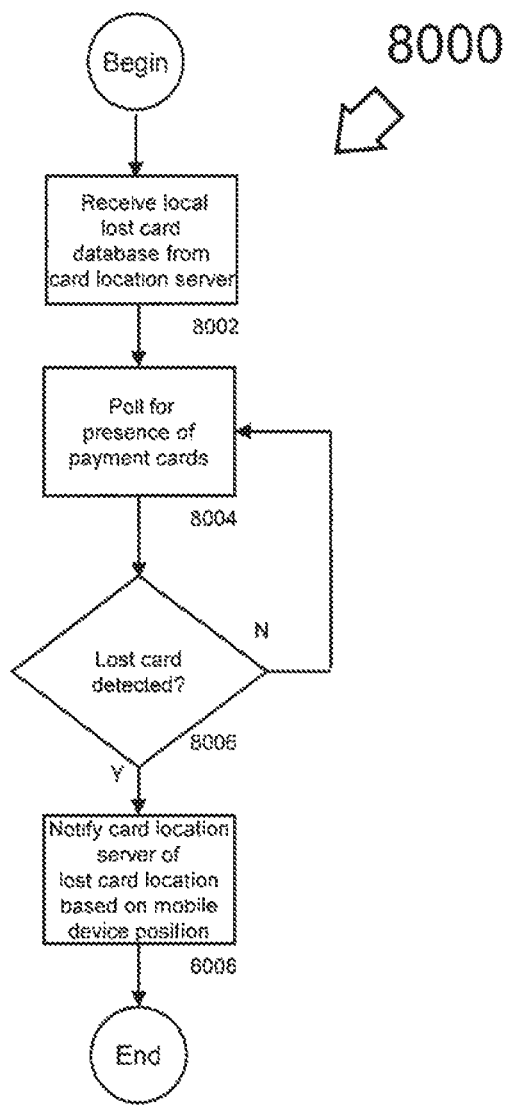
FIG. 8 flow charts a lost payment card location reporting method by a mobile device.

FIG. 8 illustrates a flow chart of method 8000 of lost payment card location reporting by a mobile device 3000, constructed and operative in accordance with an embodiment of the present disclosure.

At block 8002, a mobile device 3000 receives a local lost card database 3210 from card location server 4000. As discussed in method 7000 above, the local lost card database 4230 is a list or other data structure of the lost cards where the last known location are proximate to the current mobile device 3000 location.

The mobile device 3000 polls for the presence of payment cards 2000, block 8004.

If no lost card is detected, the process flow returns to block 8004.

If a lost card is detected, as determined at block 8006, the mobile device 3000 notifies the card location server 4000 of the lost card location based on the mobile device's current position, block 8008.

Figure 9:
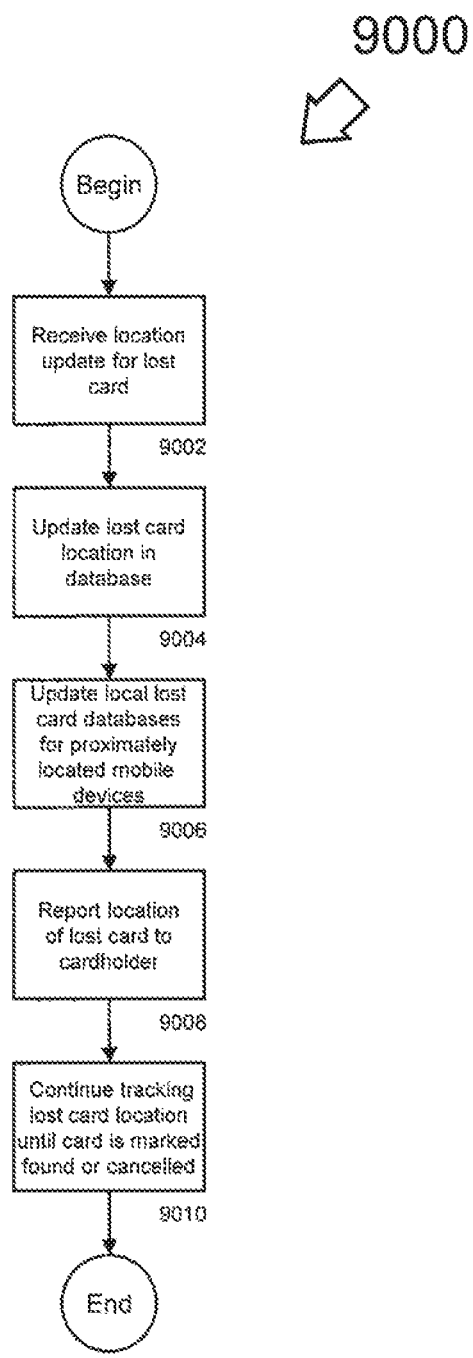
FIG. 9 illustrates a method of reporting lost payment card location to a cardholder by a card tracking server.

FIG. 9 illustrates a flow chart of method 9000 reporting lost payment card location to a cardholder by a card tracking server, constructed and operative in accordance with an embodiment of the present disclosure. Once a lost payment card's location has been reported to the card location server 4000, block 9002, the payment card's location is updated in the card location database 4210, block 9004. Mobile devices 3000 that are proximate to the new location are alerted with an updated local lost card database 3210, block 9006.

At block 9008, the lost the card location server 4000 reports the location information to the cardholder by any method known in the art, including via an automated telephone call from the card location server 4000, electronic mail, text message, disclosure to an application on a mobile device 3000, or any other method known in the art. The cardholder may then use that information to find their lost payment card 2000.

The system continues to track the lost card until the payment card is reported found or cancelled by the cardholder, block 9010.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

What is claimed is:

1. A method comprising:
   receiving data indicating that a payment card is lost;
   determining a last known location of the payment card;
   determining a mobile device within an area associated with the last known location of the payment card;
   generating a data structure comprising at least an identifier associated with the payment card; and
   transmitting the data structure to the mobile device, wherein the mobile device is configured to wirelessly poll, via an antenna of the mobile device, for a presence of the payment card.

2. The method of claim 1, further comprising receiving a message indicating that the payment card was detected by the mobile device and location information related to a location of detection of the payment card.

3. The method of claim 2, further comprising providing at least a portion of the location information to a device of a cardholder associated with the payment card.

4. The method of claim 1, further comprising determining the area based on a population density associated with the last known location.

5. The method of claim 1, wherein generating the data structure comprising at least the identifier associated with the payment card comprises generating a list of identifiers of a plurality of payment cards associated with a corresponding last known location within a threshold range of the mobile device.

6. The method of claim 1, further comprising updating a status of the payment card in a database to indicate that the payment card is lost in response to receiving the data indicating that the payment card is lost.

7. The method of claim 1, wherein determining the last known location of the payment card comprises querying a device associated with the payment card for the last known location of the payment card.

8. A system, comprising:
   a memory comprising computer-executable instructions; and
   a processor functionally coupled to the memory and configured, by the computer-executable instructions, to perform at least the following actions,
   receiving data indicating that a payment card is lost,
   determining a last known location of the payment card,
   determining a mobile device within an area associated with the last known location of the payment card,
   generating a data structure comprising at least an identifier associated with the payment card, and
   transmitting the data structure to the mobile device, wherein the mobile device is configured to wirelessly poll, via an antenna of the mobile device, for a presence of the payment card.

9. The system of claim 8, wherein the processor is configured to receive a message indicating that the payment card was detected by the mobile device and location information related to a location of detection of the payment card.

10. The system of claim 9, wherein the processor is configured to provide at least a portion of the location information to a device of a cardholder associated with the payment card.

11. The system of claim 8, wherein the processor is configured to determine the area based on a population density associated with the last known location.

12. The system of claim 8, wherein generating the data structure comprising at least the identifier associated with the payment card comprises generating a list of identifiers of a plurality of payment cards associated with a corresponding last known location within a threshold range of the mobile device.

13. The system of claim 8, wherein the processor is configured to update a status of the payment card in a database to indicate that the payment card is lost in response to receiving the data indicating that the payment card is lost.

14. The system of claim 8, wherein determining the last known location of the payment card comprises querying a device associated with the payment card for the last known location of the payment card.

15. A non-transitory computer-readable medium comprising computer-executable instructions that when executed by a processor perform the method comprising:
receiving data indicating that a payment card is lost;
determining a last known location of the payment card;
determining a mobile device within an area associated with the last known location of the payment card;
generating a data structure comprising at least an identifier associated with the payment card; and
transmitting the data structure to the mobile device, wherein the mobile device is configured to wirelessly poll, via an antenna of the mobile device, for a presence of the payment card.

16. The non-transitory computer-readable medium of claim 15, wherein the processor is configured to receive a message indicating that the payment card was detected by the mobile device and location information related to a location of detection of the payment card.

17. The non-transitory computer-readable medium of claim 16, wherein the processor is configured to provide at least a portion of the location information to a device of a cardholder associated with the payment card.

18. The non-transitory computer-readable medium of claim 15, wherein the processor is configured to determine the area based on a population density associated with the last known location.

19. The non-transitory computer-readable medium of claim 15, wherein generating the data structure comprising at least the identifier associated with the payment card comprises generating a list of identifiers of a plurality of payment cards associated with a corresponding last known location within a threshold range of the mobile device.

20. The non-transitory computer-readable medium of claim 15, wherein the processor is configured to update a status of the payment card in a database to indicate that the payment card is lost in response to receiving the data indicating that the payment card is lost.

* * * * *